UNITED STATES PATENT OFFICE.

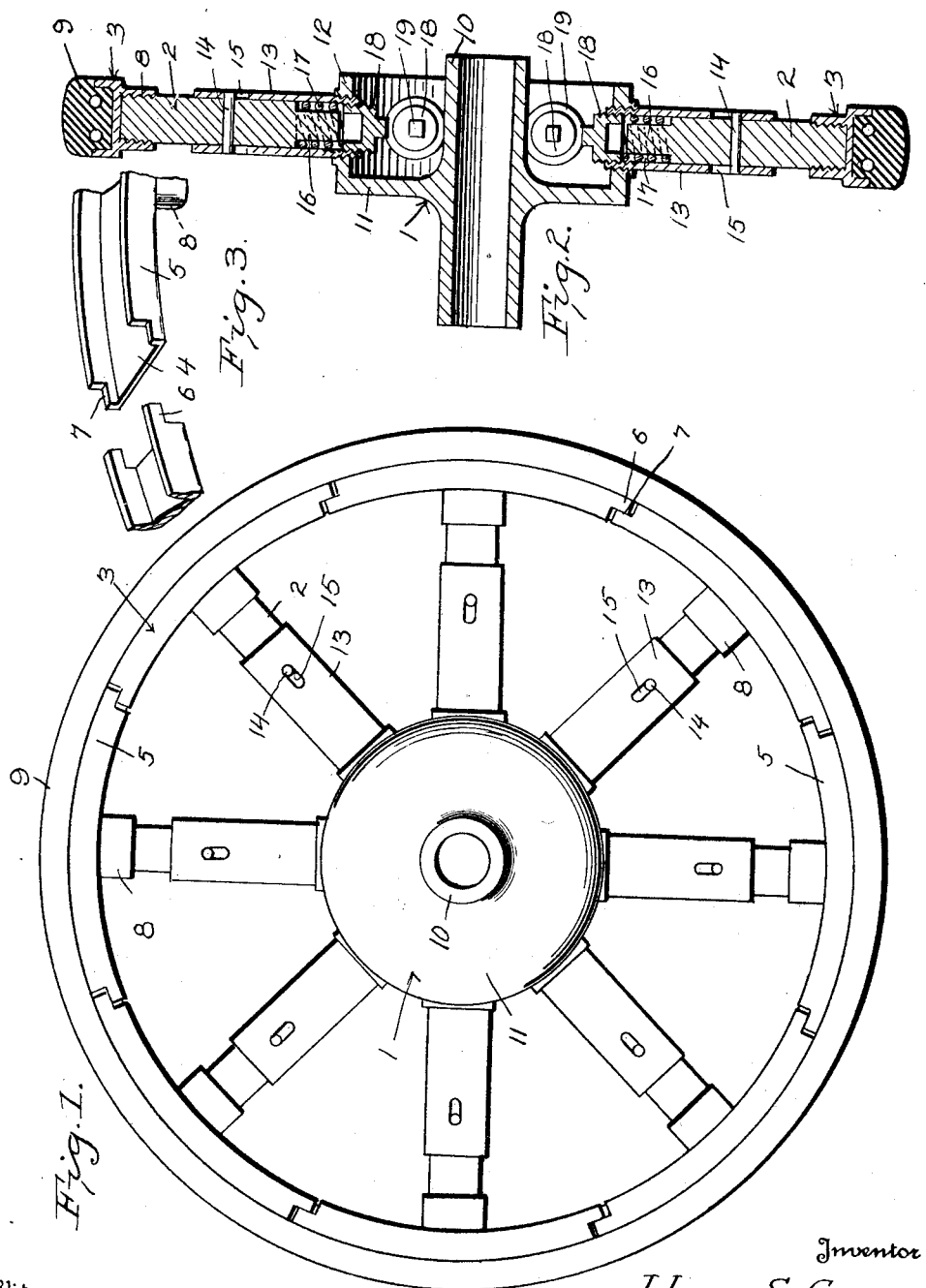

HARRY S. GOVER, OF BEL AIR, MARYLAND.

SPRING-WHEEL.

1,112,285.  Specification of Letters Patent.  Patented Sept. 29, 1914.

Application filed February 25, 1914. Serial No. 820,869.

*To all whom it may concern:*

Be it known that I, HARRY S. GOVER, a citizen of the United States, residing at Bel Air, in the county of Harford and State of Maryland, have invented certain new and useful Improvements in Spring-Wheels; and I do hereby declare the following to be a full, clear, and exact description of the invention, such as will enable others skilled in the art to which it appertains to make and use the same.

My invention relates to new and useful improvements in spring wheels and resides in the provision of a spring wheel which is simple as to construction, and constructed to provide great resiliency and durability.

An important object of my invention is to provide a spring wheel of the character described which is constructed so that great resiliency is provided and enabling the use of solid tires with equally as good results as obtained with the usual pneumatic tire.

Another important object of my invention is to provide a spring wheel of the character described which consists of a plurality of springs that are operatively connected with spokes and independently adjustable to provide for their desired tension.

Another important object of my invention is to provide a spring wheel of the character described which is formed of a number of sections and thus being capable of being readily assembled and disassembled.

A still further important object of my invention is to provide a spring wheel of the character described which is simple as to construction, strong, durable and cheap to manufacture.

The above and additional objects are accomplished by such means as are illustrated in the accompanying drawings, described in the following specification and then more particularly pointed out in the claim which is appended hereto and forms a part of this application.

With reference to the drawings, wherein I have illustrated the preferred embodiment of my invention as it is reduced to practice, and throughout the several views of which similar reference numerals designate corresponding parts: Figure 1 is a side elevation of my wheel showing it as it would appear when in assembled position. Fig. 2 is a horizontal sectional view taken through the wheel showing the detail construction and arrangement thereof, and Fig. 3 is a fragmentary perspective view showing the detail arrangement for connecting the sections of the rim.

Referring to the drawings by characters of reference the numeral 1 designates as an entirety a hub to which is operatively connected a plurality of spokes 2 that are in turn connected at their outer ends with segmental rim sections 3. The segmental rim sections 3 each comprise an arcuate body plate 4 having upstanding tire securing flanges 5 on its longitudinal edges. The ends of the flanges 5 are recessed to provide tongues 6 and grooves 7 which are designed to coöperate with each other when the sections are fitted to form a rim in overlapping engagement with each other. Each rim section 3 is provided centrally of its ends with an internally screw threaded nipple 8. The spokes 2 are turned at their outer ends into the screw threaded nipple 8 of the section 3. A cushion tire 9 is positioned between the flanges 5 when the rim sections 3 are fitted together to form a continuous rim. The hub 1 consists of a tubular body portion 10 that is provided centrally of its ends with an integrally formed circular plate 11 that is disposed at right angles to the support 10 and provided upon its periphery with a circular flange 12. The flange 12 is provided with a plurality of screw threaded openings into which are turned the inner ends of a plurality of tubular casings 13. The tubular casings 13 receive the spokes 2. The spokes 2 are slidable in the tubular casings 13 and are held against accidental derangement by means of pins 14 that are inserted transversely through the spokes 2 at points approximately centrally of the ends thereof and at their ends are slidably mounted within opposed longitudinal slots 15 formed in the casings 13. The free ends of pins 14 terminate flush with relation to the outer surfaces of the casings 13. The slots 15 are of sufficient length to permit sliding action of the spokes 2. The tubular casings 13 receive approximately two thirds of the spokes 2 thus insuring the proper sliding operation of the spokes and providing strength for the structure in general.

The inner ends of the spokes 2 are reduced as at 16 and mounted upon the reduced portions 16 of the spokes are helical expansion springs 17. These springs bear at their outer terminals upon the shoulders formed by the reducing of the spokes and at their inner terminals engage the outer ends of adjusting members 18. The adjusting members 18 are cup-shaped and externally screw threaded. The adjusting members 18 are turned into the inner internally screw threaded ends of the tubular casings 13 and provided with angular faced extensions 19 to provide for engagement thereof with a wrench or other suitable tool.

It will be readily seen that the adjustment provided the members 18 enables the setting of the springs 17 to the desired tension. The reduced portions 16 on each spoke is adapted to extend within the cup-shaped adjusting members 18 when the members 18 are moved upwardly to adjust the springs.

It will be readily seen that I have provided a simple and inexpensive spring wheel which is reliable and efficient in operation and capable of withstanding rough usage for reason of the fact of its strong construction.

In practice, I have found that the form of my invention, illustrated in the drawings and referred to in the above description, as the preferred embodiment, is the most efficient and practical; yet realizing that the conditions concurrent with the adoption of my device will necessarily vary, I desire to emphasize the fact that various minor changes in details of construction, proportion and arrangement of parts may be resorted to, when required, without sacrificing any of the advantages of my invention, as set forth.

What is claimed is:—

A spring wheel comprising a hub having a plurality of spaced screw threaded openings in the periphery thereof, tubular casings having their inner ends externally and internally threaded and turned in said screw threaded openings in the hub, a rim, a plurality of cylindrical spokes secured at their outer ends to said rim and positioned for sliding movement within the casings, means to slidably secure the spokes to the casings, the inner ends of the spokes being reduced to provide annular shoulders, helical expansion springs mounted on the reduced portions of the spokes and engaging the shoulders at their outer ends, externally threaded cup-shaped adjusting members turned within the externally threaded ends of the tubular casings, engaging the inner ends of the springs, and receiving the reduced ends of the spokes, and angular spaced projections on the inner faces of said adjusting members.

In testimony whereof I affix my signature in presence of two witnesses.

HARRY S. GOVER.

Witnesses:
HARVEY F. MITCHELL,
ANNA LEE WILSON.

Copies of this patent may be obtained for five cents each, by addressing the "Commissioner of Patents, Washington, D. C."